W. C. MARTIN.
CUSHION TIRE CONSTRUCTION.
APPLICATION FILED DEC. 1, 1917.

1,292,345.

Patented Jan. 21, 1919.

William C. Martin
INVENTOR.

BY
ATTORNEYS.

UNITED STATES PATENT OFFICE.

WILLIAM C. MARTIN, OF CHICAGO, ILLINOIS, ASSIGNOR, BY DIRECT AND MESNE ASSIGNMENTS, TO MORAND BROS-MARTIN CUSHION WHEEL CO., OF CHICAGO, ILLINOIS, A CORPORATION OF ILLINOIS.

CUSHION-TIRE CONSTRUCTION.

1,292,345. Specification of Letters Patent. Patented Jan. 21, 1919.

Application filed December 1, 1917. Serial No. 204,854.

*To all whom it may concern:*

Be it known that I, WILLIAM C. MARTIN, a citizen of the United States, residing at Chicago, in the county of Cook and State of Illinois, have invented new and useful Improvements in Cushion-Tire Constructions, of which the following is a specification.

This invention relates particularly to cushion-tires, and is especially desirable for use in connection with motor vehicles.

The primary object is to provide a simple, durable and thoroughly practicable cushion-tire construction which can be manufactured at moderate cost, which can be applied to the wheel with great facility, and which is capable of utilizing, in a high degree, the resilience throughout the circumference of the wheel of the special cushion element employed, thus lessening the local deformation of the tire and distributing and dissipating the force of shocks produced by rough roads.

The invention is illustrated, in its preferred embodiment, in the accompanying drawing, in which—

Figure 1:
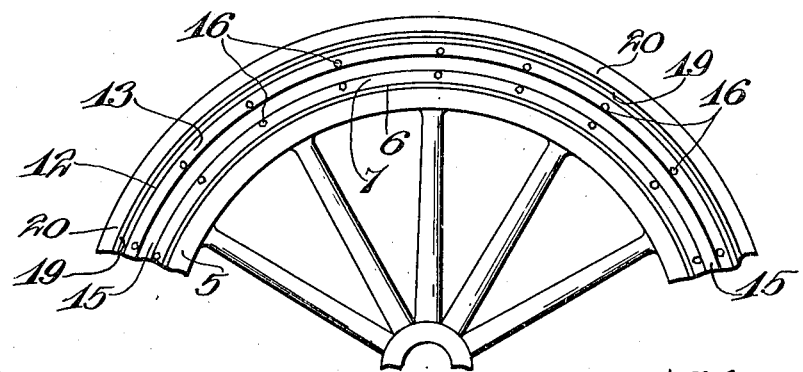
Figure 2:
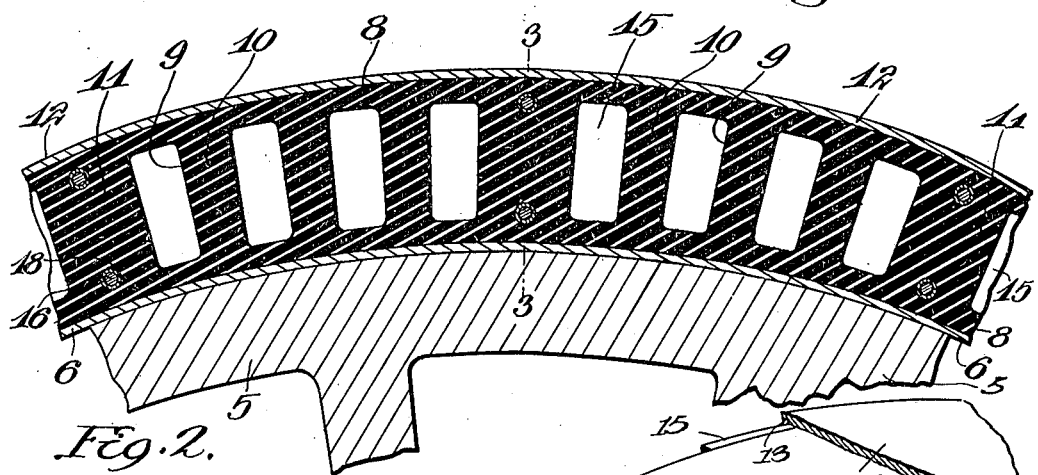
Figure 4:
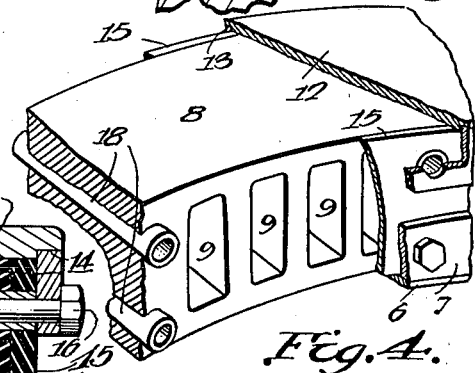
Figure 3:
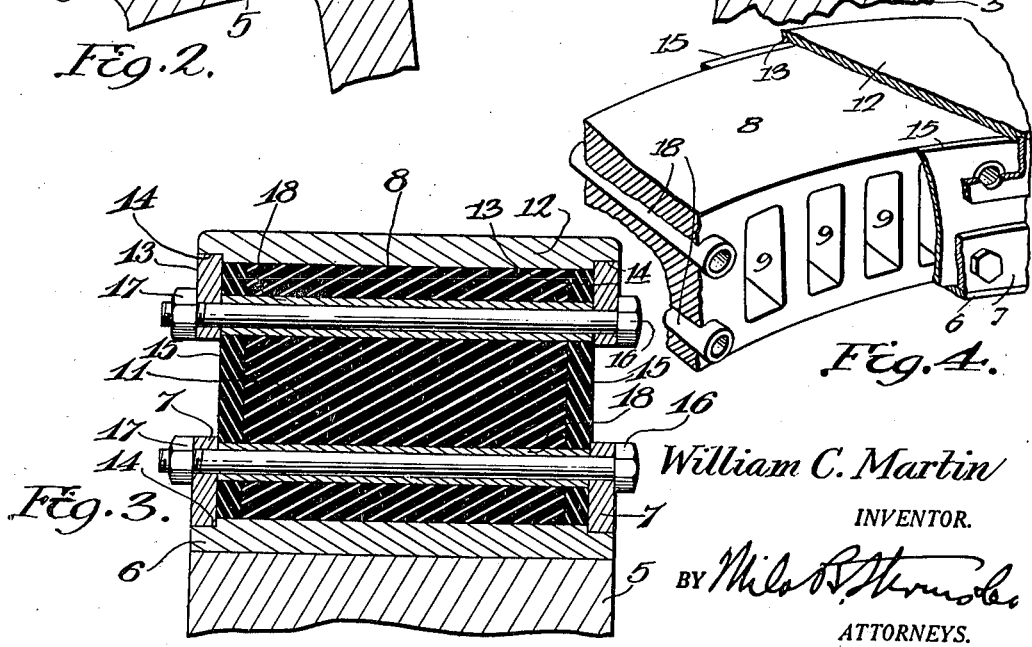

Figure 1 represents a fragmentary elevational view of a wheel equipped with a cushion-tire in accordance with the invention; Fig. 2, an enlarged broken sectional view thereof with the outer rubber tire and the rim on which it is mounted omitted; Fig. 3, an enlarged broken transverse sectional view taken as indicated at line 3—3 of Fig. 2; and Fig. 4, a broken perspective view of the cushion device.

In the embodiment illustrated, 5 designates the felly of the wheel, to which is applied the novel cushion-tire construction. This construction comprises suitably-spaced inner and outer annular metal channel-members, or channel-form rims, the flanges of each of said rims being turned toward the flanges of the other rim, and being preferably detachable; and cushioning means interposed between and firmly secured to the opposed channel-form rims and comprising preferably, an annulus of rubber having a series of transverse openings extending therethrough, and a pair of relatively thin annular strips of rubber flanking the first-mentioned rubber annulus, the rubber cushioning means thus described constituting, as a whole, a cellular rubber annulus having closed sides.

In the illustration given, the inner annular channel-form rim comprises a metal band 6, which may be shrunk upon the felly 5; and detachable metal flanges 7 in the form of rings, which have their inner circumferential surfaces seating snugly in lateral recesses with which the band 6 is provided, the flanges 7 extending outwardly and lying in planes perpendicular to the axis of the wheel.

The cushioning means comprises preferably a rubber annulus 8 of rectangular cross-section and provided with a series of transverse substantially rectangular perforations 9, which are arranged in groups whose members have between them regularly spaced partitions 10 of approximately the same cross-section as the perforations, the groups of perforations, or openings, being separated by thicker radial partitions 11, which are themselves regularly spaced; and resilient annular plates, or rings of rubber, 15, which embrace the sides of the cushion element 8 and have their inner circumferential surfaces flush with the inner circumferential surface of the member 8, and their outer circumferential surfaces flush with the outer circumferential surface of the member 8. Thus, the intermediate cushion element 8 and the flanking cushion elements 15, considered together, form a resilient cushioning means provided with closed air cells.

The cushioning means comprising the main intermediate cushion element 8 and the flanking cushion elements 15 is closely confined between and secured to the inner channel-form rim and the outer channel-form rim. The outer channel-form rim comprises a metal band 12 and separable metal flanges 13, the outer circumferential portions of the flanges 13 fitting snugly in recesses, or rabbets, 14, with which the band 12 is provided. The flanges 13 are disposed in planes perpendicular to the axis of the wheel, extend inwardly from the band 12, and are located opposite the flanges 7, from which they are spaced a sufficient distance to permit adequate relative movement between the inner and outer channel-form rims. The rabbets in which the flanges 7 are seated are designated 14, also. The inner and outer channel-form rims have their flanges securely attached to the rubber cushioning elements by means of bolts 16, which extend through the flanges and through the interposed portions of the rubber cushion elements at the inner and outer end-portions of the relatively thick radial partitions 11 of the main cushion element 8. These bolts are arranged in annular rows, and preferably extend through corresponding annular rows of metal tubes, or sleeves, 18, which afford bushings extending through the rubber elements and serving as spacing devices for the pair of flanges 7 and the pair of flanges 13. The ends of the bushings are substantially flush with the inner walls, or shoulders, of the rabbets 14, so that the bolts may be securely tightened without distorting or placing undue strain upon the flanges.

It is preferred to mount a rubber tire upon the outer channel-form rim; and this is preferably accomplished by shrinking upon the band 12 a band, or tire-carrying rim, 19, upon which is secured, in any suitable manner, the rubber tire 20.

From the description given, it will be understood that the cushion construction is simple, inexpensive to manufacture, thoroughly effective for its purpose, and capable of long service. The concentric channel seats for the rubber cushioning means protect the latter from dislodgment under lateral stress and shock; the bolts, passing through the strongest sections of the main rubber cushion element 8, prevent relative movement of the parts; and the resilient annular housing-strips 15 not only exclude mud, water and grit, and confine the air within the cells 9, but also form, in the preferred construction, quite strong elastic connections between the inner and outer channel-form rims. The radial projections of the main cushioning element 8 serve to transmit direct thrust to the road, and are also placed under direct tension throughout other portions of the circumference of the wheel, so that the minimum amount of rubber may be used in the construction. It will be understood that deformation of the outer channel-form rim is resisted by compression of the rubber cushioning means at some portions of the circumference, and by tension exerted upon the rubber cushioning means at other portions of the circumference. The importance of securely connecting the inner and outer channel-form rims to the interposed cushioning means will be understood, therefore.

The cushion construction combines great strength, resiliency, and light weight, and is capable of distributing and dissipating shocks to an extraordinary extent; and the tendency of the wheel to return to its normal shape after excessive shock will be appreciated from the explanation.

The rubber annulus 8 may be formed by wrapping a suitably molded strip of rubber about the inner band 6 and securing its ends together in any suitable manner; or, if desired, the cushion element 8 may be molded in annular form. Proportions of parts may be varied, according to the vehicle upon which the device is to be used, and the character of the duty which will be required of the tire. For use in connection with a three-ton truck, a radial dimension of about 2¾ inches for the element 8, with a transverse dimension of the relative proportions shown in Fig. 2, serves the purpose admirably. However, the size and proportions may vary greatly, depending upon the vehicle and the duty to which the wheel will be subjected. The element 8 may be provided, in the molding operation, with perforations for receiving the bushings 18; or, the bushings 18 may be embedded in the cushion element 8 in the molding operation, the extremities of the bushings being allowed to project past the sides of the element 8 sufficiently to extend through the perforations in the flexible resilient side rings 15.

While both flanges 7 of the inner channel-form rim and both flanges 13 of the outer channel-form rim are shown detachable, it will be understood that it will suffice for assembly purposes to have one flange only of one rim detachable. In any event, the annular flanges, constituting inserts as they do, in the bands with which they are associated, give practically the same results when the wheel is in use as would result from integrally-formed flanges.

The foregoing detailed description has been given for clearness of understanding only, and no unnecessary limitation should be understood therefrom, but the appended claims should be construed as broadly as permissible, in view of the prior art.

What I regard as new, and desire to secure by Letters Patent, is:

1. In a cushion-tire, the combination of a pair of spaced reversely flanged continuous inner and outer channel-form rims, interposed cushioning means comprising an intermediate rubber annulus provided with transverse openings and annular flexible housing-strips embracing said rubber annulus and confined between the flanges of said rims, and bolts connecting the flanges of each rim and extending through the intervening portions of said rubber annulus and said annular housing-strips.

2. In a cushion-tire, the combination of an intermediate rubber annulus provided with a series of transverse air cells separated by radial partitions, annular flexible housing-strips embracing the sides of said rubber annulus and extending substantially flush with the inner and outer circumferential surfaces thereof, reversely flanged continuous inner and outer channel-form rims in which said annulus and housing strips are seated, an inner and outer annular series of sleeves extending through the seating portions of said annulus and housing strips and interposed between the rim-flanges, and bolts extending through the sleeves of each series and through the embracing flanges of the corresponding rim.

3. In means of the character set forth, the combination of a main intermediate annular rubber cushion element provided with groups of transverse perforations separated by radial walls, the groups of perforations being separated by thicker radial walls, annular rows of transverse bushings extending through said cushion element at the points where said thicker radial walls are located, annular resilient rings embracing the sides of said intermediate element and having perforations engaging the end-portions of said bushings, continuous inner and outer channel-form rims having flanges turned toward each other, one of said flanges being detachable, and annular rows of bolts extending through said bushings and through the flanges engaging the bushings and serving to secure the parts together.

4. In a device of the character set forth, the combination of a rubber cushion of annular form and of substantially rectangular cross-section, two annular series of bushings extending transversely through said annular rubber cushion at the inner and outer portions thereof, continuous inner and outer channel-form rims in which the inner and outer circumferential portions of said annular rubber cushion are confined, one of said rims having a detachable flange, and an annular series of bolts extending through each pair of flanges and the interposed series of bushings.

5. In a device of the character set forth, cushioning means comprising a rubber annulus provided with a series of air chambers and provided with inner and outer annular rows of transverse bushings extending through and projecting beyond the sides of said annulus, and a pair of flexible housing rings embracing the sides of said annulus and provided with an inner and outer series of perforations through which the end-portions of said bushings extend.

In testimony whereof I affix my signature.

WILLIAM C. MARTIN.